(12) United States Patent
Malvar et al.

(10) Patent No.: US 7,706,607 B2
(45) Date of Patent: Apr. 27, 2010

(54) OPTIMIZED COLOR IMAGE ENCODING AND DECODING USING COLOR SPACE PARAMETER DATA

(75) Inventors: Henrique S. Malvar, Sammamish, WA (US); Hubert Van Hoof, Seattle, WA (US); Michael D. Stokes, Eagle, ID (US)

(73) Assignee: Microsoft Corporation, Redmond, WA (US)

( * ) Notice: Subject to any disclaimer, the term of this patent is extended or adjusted under 35 U.S.C. 154(b) by 1049 days.

(21) Appl. No.: 11/159,803

(22) Filed: Jun. 23, 2005

(65) Prior Publication Data

US 2006/0291720 A1 Dec. 28, 2006

(51) Int. Cl.
*G06K 9/00* (2006.01)
*G06K 9/36* (2006.01)
*G06K 9/46* (2006.01)

(52) U.S. Cl. ................................ 382/166; 382/232
(58) Field of Classification Search ................ 382/166, 382/232

See application file for complete search history.

(56) References Cited

U.S. PATENT DOCUMENTS

| | | | | | |
|---|---|---|---|---|---|
| 5,341,442 | A | * | 8/1994 | Barrett | 382/166 |
| 5,583,656 | A | * | 12/1996 | Gandhi et al. | 382/234 |
| 5,712,925 | A | * | 1/1998 | Ohga | 382/167 |
| 5,822,452 | A | * | 10/1998 | Tarolli et al. | 382/166 |
| 5,847,847 | A | * | 12/1998 | Kosaka | 358/508 |
| 5,940,585 | A | * | 8/1999 | Vondran et al. | 358/1.15 |
| 6,075,619 | A | * | 6/2000 | Iizuka | 382/166 |
| 6,198,552 | B1 | * | 3/2001 | Nagae | 358/518 |
| 7,327,480 | B1 | * | 2/2008 | Ida et al. | 358/1.15 |
| 2002/0051223 | A1 | * | 5/2002 | Izumi et al. | 358/402 |
| 2003/0021472 | A1 | * | 1/2003 | Nichogi et al. | 382/166 |
| 2004/0165780 | A1 | * | 8/2004 | Maki et al. | 382/232 |
| 2004/0218812 | A1 | * | 11/2004 | Douglass | 382/166 |
| 2004/0228527 | A1 | * | 11/2004 | Iourcha et al. | 382/166 |
| 2007/0005795 | A1 | * | 1/2007 | Gonzalez | 709/232 |

OTHER PUBLICATIONS

ISO/IEC 15444-1, "Information technology—JPEG2000 Image Coding System" 2000, Annex I, "JP2 file format syntax".*

* cited by examiner

*Primary Examiner*—Samir A. Ahmed
*Assistant Examiner*—Li Liu
(74) *Attorney, Agent, or Firm*—Shook, Hardy & Bacon L.L.P.

(57) ABSTRACT

Optimized color codecs and methods of compressing and decompressing color images using programmable color space parameters are provided. In accordance with one method of encoding a color image, input data comprising input image pixel data and color space parameters is provided. The input image pixel data is compressed based on the color space parameter data. The color space parameter data is then appended to the compressed image pixel data. In accordance with one method of decoding a compressed color image, compressed data is provided that comprises compressed image pixel data and color space parameters. The color space parameters are separated from the compressed image pixel data. The compressed image pixel data is then decompressed based on the color space parameters.

15 Claims, 7 Drawing Sheets

OPTIMIZED COLOR IMAGE ENCODING AND DECODING USING COLOR SPACE PARAMETER DATA

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND

The use of digital color images has grown rapidly over the past two decades in a wide variety of applications such as digital cameras and Web pages. Because digital color images are often very large files, compression is desirable to reduce the size of the files for storage and transmission purposes. By reducing the size of files, more digital images may be fit on a storage medium, such as a hard drive or a CD-ROM. Further, digital images may be transferred quicker using bandwidth limited transmission media, such as telephone lines and USB cables.

Currently, the most widely used method of compressing static digital images is the JPEG (Joint Photographic Experts Group) standard. However, a wide variety of other compression techniques have been developed for compressing both digital static images and digital video images. The various techniques have been employed in a multitude of compression image file formats, such as TIFF (Tag Image File Format), JPEG (Joint Photographic Expert Group), PNG (Portable Network Graphics), MPEG (Motion Pictures Expert Group), and WMV (Windows Media Video), for example.

In developing the various image compression codecs (encoder/decoder), the focus has been primarily on the compression/decompression techniques and the file formats. As a result, most current image compression codecs are not aware of specific details about the color space in which the original bitmap pixel data for an image resides. For example, JPEG assumes that input images reside in an RGB (red/green/blue) color coordinate space with 8 bpcc (bits per color channel) and a gamma value of 2.2. Moreover, the codecs do not support the ability to programmatically change the various aspects of an image's color space, such as bit format, tone reproduction curve (or gamma), and color space primaries. Accordingly, compression and decompression using current image codecs results in the same original and output color spaces. To change the color space of an image, processing must be performed on the image outside of the codec.

Referring to FIG. 2, a block diagram of the compression and decompression of a color image using a current codec is generally illustrated. An input bitmap 202 is compressed by an encoder 204 and the compressed data 206 is stored and/or transmitted. The compressed data 206 may then be decompressed by a decoder 208, which provides an output bitmap 210. The output bitmap 210 from the decoder 208 resides in the same color space as the input bitmap 202 received by the encoder 204. If the source and destination of the image are defined by different color spaces, the color space of the image must be converted at some point separately from the encoder 204 and decoder 208. The result is the need for gratuitous processing for color space conversion and thus the loss of potential performance optimizations.

Accordingly, a color image codec that includes specific information about the color space in which the original input image resides and the color space in which the image is encoded would be desirable. Additionally, the ability to compress an image from any given input color space to any given compression color space would be advantageous. Further, it would be beneficial if the codec included the ability to decompress an image from any given compression color space to any given output color space.

BRIEF SUMMARY

Embodiments of the present invention relate to methods for compressing and decompressing image data using programmable color space parameters. In addition, embodiments of the present invention relate to an optimized color encoder and an optimized color decoder. Accordingly, in one aspect of the present invention, an embodiment is directed to a method of encoding color image data. The method includes providing input data that includes input image pixel data and color space parameter data. The method also includes compressing the input image pixel data based on at least a portion of the color space parameter data. Further, the method includes appending at least a portion of the color space parameter data with the compressed image pixel data.

In another aspect, an embodiment of the present invention relates to a method of decoding compressed image pixel data. The method includes providing compressed data that includes compressed image pixel data and color space parameter data. The method also includes separating the color space parameter data from the compressed image pixel data. Further, the method includes decompressing the compressed image pixel data based on at least a portion of the color space parameter data.

A further aspect of the invention relates to an optimized color encoder for encoding color image data. The color optimized encoder includes a receiving component, an encoding component, and a multiplexing component. The receiving component is capable of receiving input data that includes input image pixel data and color space parameter data. The encoding component is capable of compressing the input image pixel data based on at least a portion of the color space parameter data. The multiplexing component is capable of appending at least a portion of the color space parameter data with the compressed image pixel data.

In still another aspect of the invention, an embodiment takes the form of an optimized color decoder for decoding compressed color image pixel data. The optimized color decoder includes a receiving component, a de-multiplexing component, and a decoding component. The receiving component is capable of receiving compressed data that includes compressed image pixel data and color space parameter data. The de-multiplexing component is capable of separating the color space parameter data from the compressed image pixel data. The decoding component is capable of decompressing the compressed image pixel data based on at least a portion of the color space parameter data.

BRIEF DESCRIPTION OF THE SEVERAL VIEWS OF THE DRAWING

The present invention is described in detail below with reference to the attached drawing figures, wherein.

DETAILED DESCRIPTION

Figure 1:
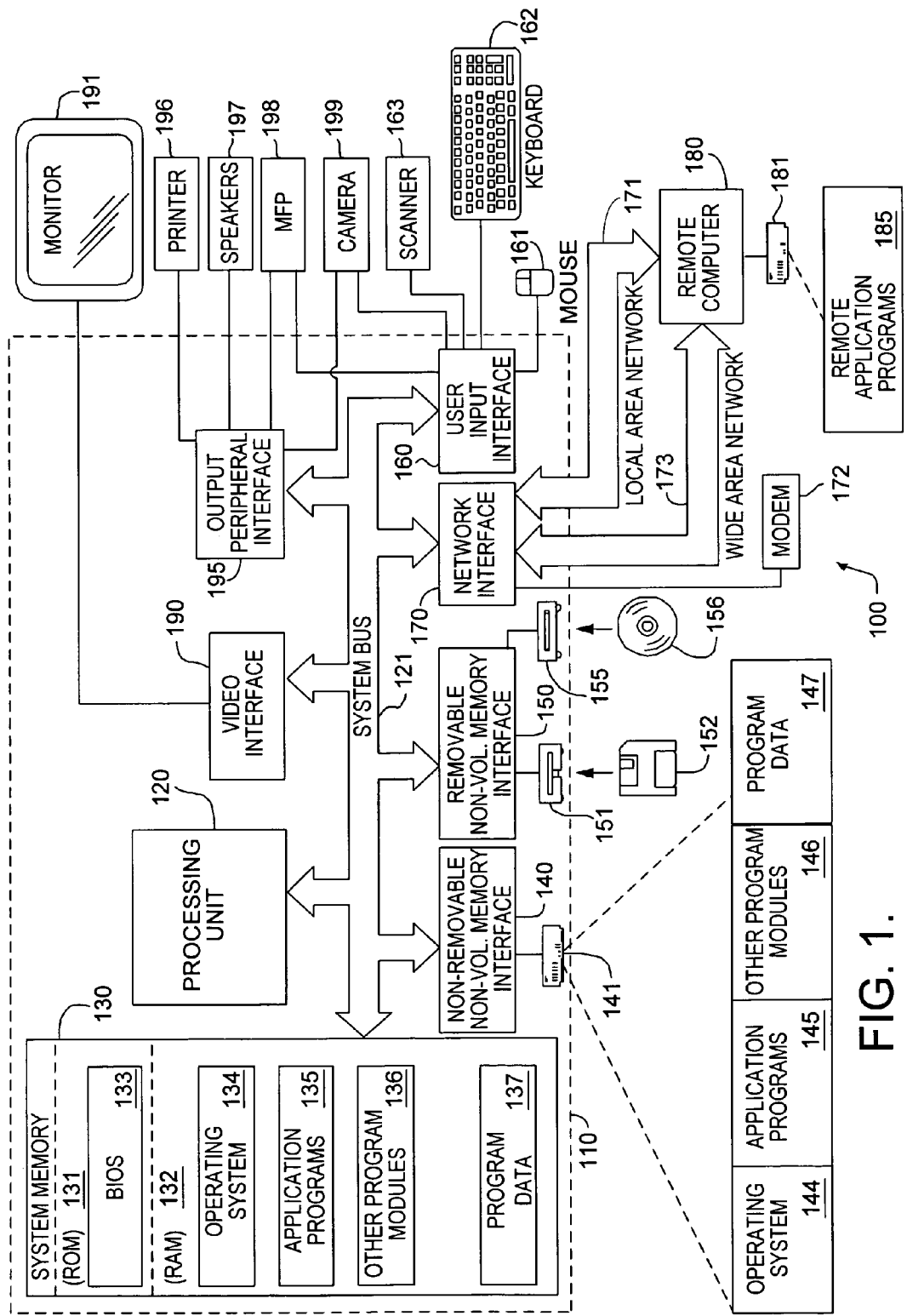
FIG. 1 is a block diagram of an exemplary computing environment suitable for use in implementing the present invention.
Figure 2:
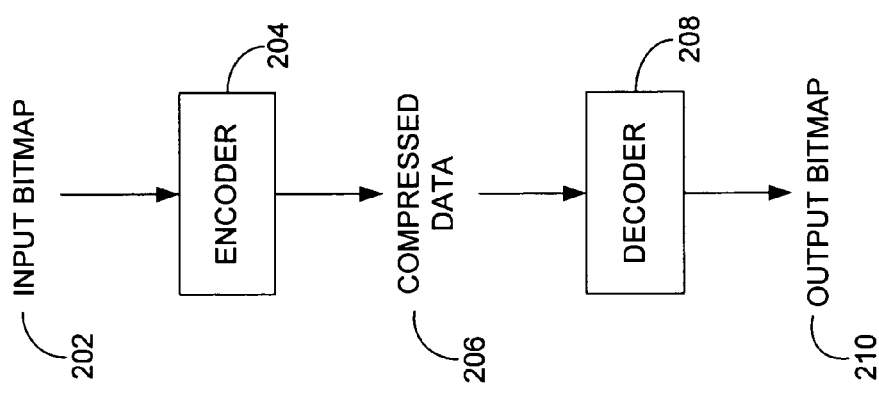
FIG. 2 is a block diagram illustrating compression and decompression of a bitmap using a conventional encoder and decoder.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Embodiments of the present invention provide methods for color optimized compression and decompression of color images. In addition, embodiments of the present invention relate to color optimized codecs. The codecs allow for the input of programmable color space parameters for compression and decompression of color images in any given color space.

One embodiment of the present invention is directed to an optimized color encoder that is capable of receiving a color image in any color space and compressing the image either in that color space or a new color space. The optimized color encoder may also append color space parameter information to the compressed image. The color space parameter information appended to the compressed image may include a set of parameters characterizing the original color space. In addition, the appended color space parameter information may include a set of parameters characterizing the color space in which the compressed image resides. By appending color space parameter information to the compressed image data, an optimized color decoder has color space information available to it for decoding purposes.

Another embodiment of the present invention is directed to an optimized color decoder that is capable of receiving a compressed image in any color space from an optimized color encoder. The optimized color decoder may separate the appended color space parameters from the compressed image data and decompress the image using the color space parameters. If the image is to be output in a particular color space, a set of output color space parameters may be provided to the optimized color decoder, which decompresses the image to that output color space.

Color space is used herein in its broadest sense to include any parameter that specifies how color information for a digital image is represented. By way of example only and not limitation, one parameter that may be used to define a color space is the color coordinate space (e.g., RGB, sRGB, scRGB, XYZ, CMYK, etc.). Another color space parameter is the bit format, which defines the number of bits per color channel of a pixel, as well as the number representation (i.e. fixed point or floating point). An additional example of color space parameters would be a set of parameters for a tone reproduction curve, for example the popular gamma curve (specified by a single parameter, the gamma value), which represents a power-law relationship between image pixel values and the displayed brightness. Still another example of color space parameters would be values used for reference colors or color space primaries (e.g., white point, red primary, green primary, blue primary, etc.).

It should be understood that any type of compression and decompression technique (e.g., those defined by the JPEG standard) may be used by the color optimized codec within the scope of the present invention. In addition, the present invention may be employed with either lossless or lossy compression. Further, both static images and video images may be compressed and decompressed using the color optimized codec within the scope of the present invention.

Having briefly described an overview of the present invention, an exemplary operating environment for the present invention is described below.

Referring to the drawings in general and initially to FIG. 1 in particular, wherein like reference numerals identify like components in the various figures, an exemplary operating environment for implementing the present invention is shown and designated generally as computing system environment 100. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose, or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, digital cameras, printers, MFPs (multi-function peripherals, or an all-in-one devices, such as a print/scan/fax/copy device), network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc., that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the present invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer-readable media. Computer-readable media can be any available media that can be accessed by computer 110 and includes both volatile and nonvolatile media, removable and non-removable media. By way of example, and not limitation, computer readable media may comprise computer storage media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110.

The system memory 130 includes computer storage media in the form of volatile and/or nonvolatile memory such as read only memory (ROM) 131 and random access memory (RAM) 132. A basic input/output system (BIOS) 133, containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks (DVDs), digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer-readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other programs 146 and program data 147 are given different numbers here to illustrate that, at a minimum, they are different copies. A user may enter commands and information into the computer 110 through input devices such as a keyboard 162, pointing device 161 (commonly referred to as a mouse, trackball or touch pad), scanner 163, digital camera 199, and MFP 198 (multi-function peripheral, or an all-in-one device, such as a print/scan/fax/copy device). Other input devices (not shown) may include a microphone, joystick, game pad, satellite dish, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor 191, computers may also include other peripheral output devices such as speakers 197, printer 196, camera 199, and MFP 198, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the network interface 170, or other appropriate mechanism. In a networked environment, program modules depicted relative to the computer 110, or portions thereof, may be stored in a remote memory storage device. By way of example, and not limitation, FIG. 1 illustrates remote application programs 185 as residing on memory device 181. It will be appreciated that the network connections shown are exemplary and other means of establishing a communications link between the computers may be used.

Although many other internal components of the computer 110 are not shown, those of ordinary skill in the art will appreciate that such components and the interconnection are well known. Accordingly, additional details concerning the internal construction of the computer 110 need not be disclosed in connection with the present invention.

When the computer 110 is turned on or reset, the BIOS 133, which is stored in the ROM 131, instructs the processing unit 120 to load the operating system, or necessary portion thereof, from the hard disk drive 141 into the RAM 132. Once the copied portion of the operating system, designated as operating system 144, is loaded in RAM 132, the processing unit 120 executes the operating system code and causes the visual elements associated with the user interface of the operating system 134 to be displayed on the monitor 191. Typically, when an application program 145 is opened by a user, the program code and relevant data are read from the hard disk drive 141 and the necessary portions are copied into RAM 132, the copied portion represented herein by reference numeral 135.

As previously mentioned, embodiments the present invention relate to methods for compressing and decompressing color images using programmable color space parameters. In addition, embodiments of the present invention are directed to an optimized color codec comprising an optimized color encoder and an optimized color decoder.

Figure 3:
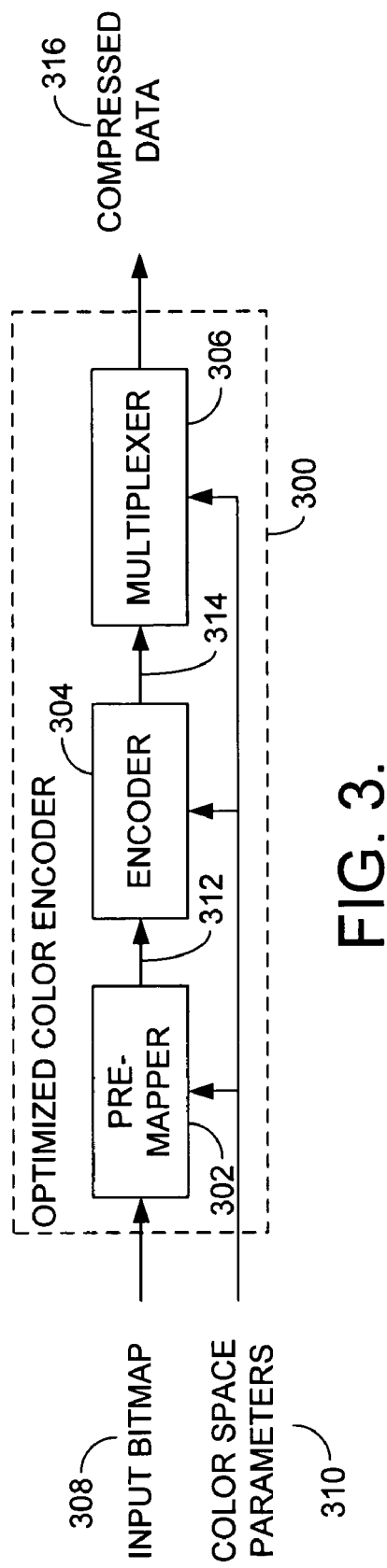
FIG. 3 is a block diagram of an optimized color encoder in accordance with an embodiment of the present invention.

Turning to FIG. 3, a block diagram is illustrated that shows a generalized optimized color encoder 300 in accordance with an embodiment of the present invention. As shown in FIG. 3, the optimized color encoder 300 may comprise, among other components, a pre-mapper 302, an encoder 304, and a multiplexer 306. The optimized color encoder 300 is capable of receiving an input bitmap 308 in any color space and compressing that bitmap either in that color space or a new color space.

The optimized color encoder 300 receives input, including an input bitmap 308 and color space parameters 310. The input bitmap 308 comprises the pixel values of a particular image residing in an input color space. In various embodiments of the present invention, the color space parameters 310 may comprise a single set of color space parameters or multiple sets of color space parameters. For example, if the input bitmap 308 is to be compressed in the original input color space, the color space parameters 310 include only input color space parameters. Alternatively, if the input bitmap 308 is to be compressed in a new color space, the color space parameters 310 will include a set of parameters for the input color space as well as a set of parameters for the new color space. By way of example only and not limitation, the new color space may be a compression optimized color space that allows for more efficient compression of the input bitmap 308. In such an embodiment, compression optimized color space parameters may be provided to the optimized color encoder 300 from an external source or may be maintained by the optimized color encoder 300. The optimized color encoder 300 may also compress to a desired destination color space. For example, if the color space of a destination device is known, the optimized color encoder 300 may be provided the parameters for this destination color space and compress the input bitmap 308 in that space.

The optimized color encoder 300 illustrated in FIG. 3 is shown with a pre-mapper 302. The pre-mapper 302 provides the ability to convert pixel values of the input bitmap 308 from the input color space to a new color space. The pre-mapper 302 receives the input bitmap 308, as well as the input color space parameters and the new color space parameters. Using the two sets of color space, parameters, the pre-mapper 302 converts the pixel values of the input bitmap 308, providing mapped pixel values 312. In embodiments of the present invention wherein the input bitmap 308 is to be compressed in the input color space, the pre-mapper 302 may not be included as a component of the optimized color encoder 300 or may be bypassed.

The encoder 304 provides compression of pixel values. It should be understood that any type of compression may be employed with the scope of the present invention. In embodiments wherein the pre-mapper 302 converts the color space of the pixel values of the input bitmap 308 from an input color space to a new color space, the encoder 304 receives the mapped pixel values 312 and the new color space parameters (e.g., the compression optimized color space parameters or destination color space parameters). Using the new color space parameters, the encoder compresses the mapped pixel values 312, providing compressed image data 314.

Figure 7:
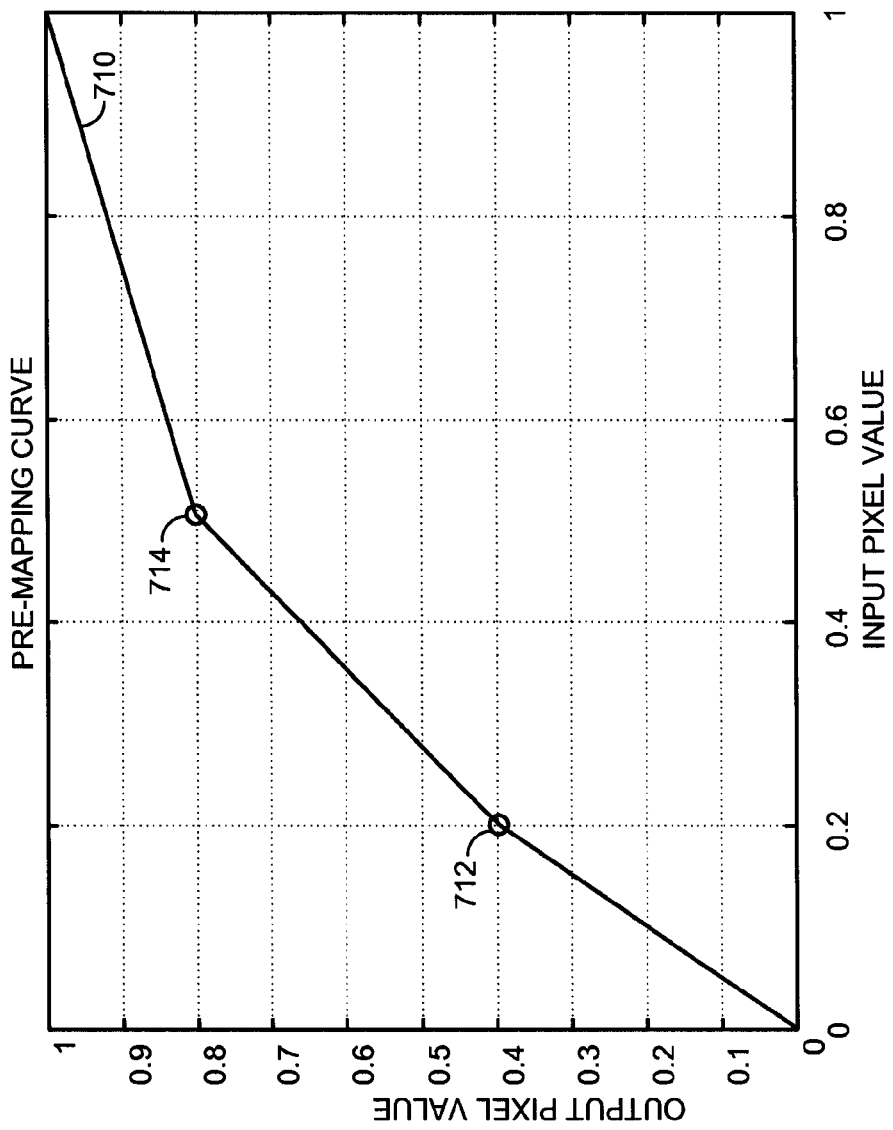
FIG. 7 is a graph showing an exemplary nonlinear pre-mapping curve.

For example, in a simple embodiment of the present invention, the encoder 304 can be one that assumes that the mapped pixel values 312 correspond to a color space with a gamma value of 2.2, such as JPEG. If the input color space parameters 310 indicate that the input bitmap 308 has pixel values corresponding to a different gamma value, then the pre-mapper 302 performs a gamma conversion step. In another simple embodiment of the present invention, the encoder 304 is still one such as JPEG, which expects the mapped pixel values 312 to be in an RGB color space. If the input color space parameters 310 indicate that the input bitmap 308 has pixel values that are in a CMY color space, the pre-mapper 302 performs a CMY-to-RGB color space conversion. In another embodiment of the present invention, the pre-mapper 302 includes a preliminary processing step that performs an analysis of the pixel values of the input bitmap 308, and determines, for example, that the input bitmap 308 corresponds to a very dark image, which will be better encoded if the dynamic range of darker tones is expanded prior to encoding (which also implies that the dynamic range of lighter tones is compressed). Then, the pre-mapper 302 applies a nonlinear curve to each pixel value that accomplishes this dynamic range correction. An example of such a non-linear curve 710 is shown in FIG. 7, which is characterized by two inflection points (marked by circles): inflection point 712 at $\{0.2, 0.4\}$ and inflection point 714 at $\{0.5, 0.8\}$. Such a curve is typically represented by five parameters: the first, equal to 2, indicates the number of inflection points, and the other four parameters are the input-output coordinates of the two inflection points.

In a more general embodiment of the present invention, the pre-mapper 302 uses both the information from the input color space parameters 310 and the results of some analysis it performs on the input bitmap 308 pixel values to determine an optimized mapping curve. The optimized mapping curve is then applied to the pixel values of the input bitmap 308 to produce the mapped pixel values 312, which are then sent to the encoder 304.

Additionally, the encoder 304 may optionally make use of the color space parameters 310. In such an embodiment, the encoder 304 is typically a modified version of an encoder such as JPEG. For example, if the input color space parameters 310 indicate that the input bitmap has a different gamma value than 2.2, then even after the pre-mapper 302 maps it to mapped pixel values 312 with a gamma of 2.2, the encoder 304 may decide that better visual results will be achieved after decoding if the encoder 304 adjusts its "quantization matrices" (a table that identifies the relative quantization step sizes for each frequency component in the discrete cosine transform domain, in the case of a JPEG encoder). Thus, a modified encoder 304 may decide to modify its encoding rules based on knowledge of the input color space parameters 310 and the operation of the pre-mapper 302.

The optimized color encoder 300 also comprises a multiplexer 306, which receives the compressed image data 314 from the encoder 302 and appends the color space parameters 310 with the compressed image data 314. In one embodiment, for example, the compressed data 314 produced by the encoder 304 contains a header field with parameters of the compressed bitmap (e.g. height and width of the bitmap, number of color channels, etc.). The multiplexer 306 combines the compressed data 314 with the color space parameters 310 by simply expanding the header area to open enough space to append the values of such parameters to the original header, thus producing the final compressed data 316. Generally, the multiplexer 306 may append any number of sets of color space parameters with the compressed image data 314. Typically, in embodiments of the present invention wherein the input bitmap 308 is compressed in a new color space, both the input color space parameters and the new color space parameters are appended. Likewise, in embodiments wherein the input bitmap 308 is compressed in the original input color space, only the input color space parameters are appended to the compressed image data 314. Accordingly, the compressed data 316 output from the optimized color encoder 300 comprises the compressed image data 314 and any appended color space parameters 310.

Figure 4:
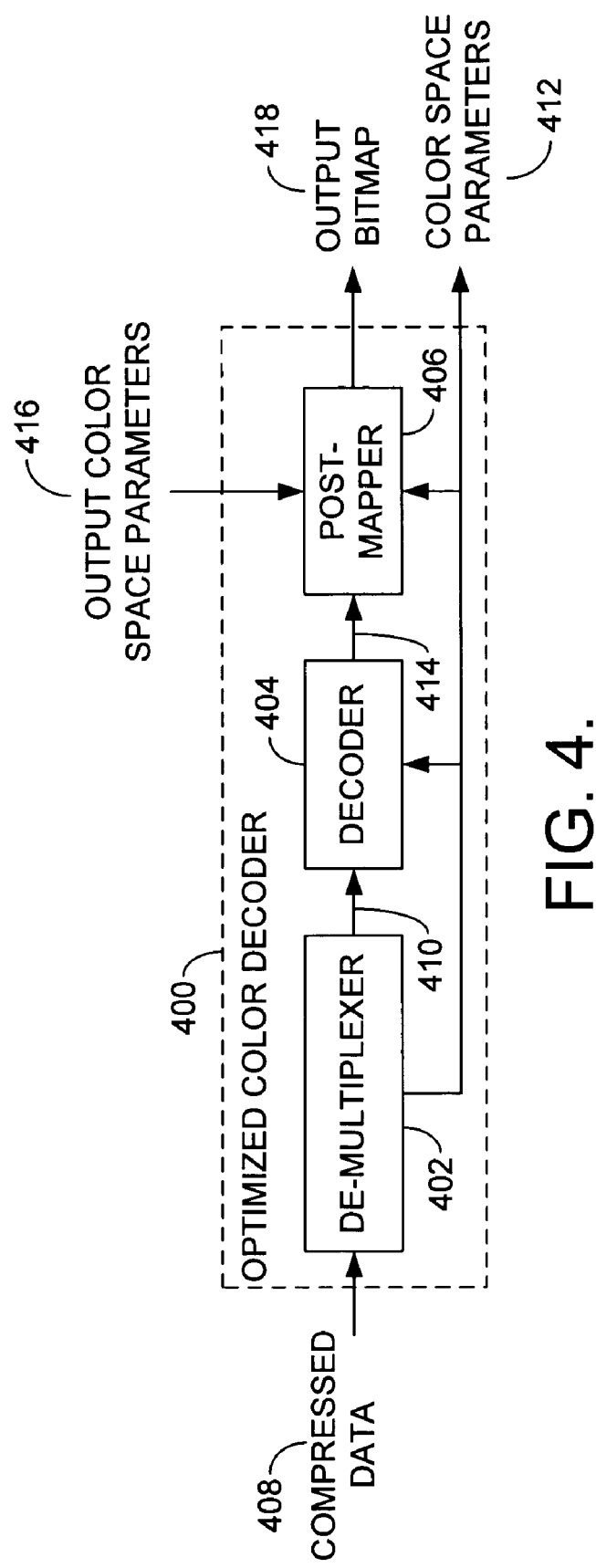
FIG. 4 is a block diagram of an optimized color decoder in accordance with an embodiment of the present invention.

Referring now to FIG. 4, a block diagram is illustrated that shows a generalized optimized color decoder 400 in accordance with an embodiment of the present invention. As shown in FIG. 4, the optimized color decoder 400 may comprise, among other components, a de-multiplexer 402, a decoder 404, and a post-mapper 406. The optimized color decoder 400 may receive compressed image data in any color space and decompress the image data either in that color space or a new color space.

The optimized color decoder 400 receives compressed data 408, for example, from the optimized color encoder 300. The compressed data 408 may be received directly from the optimized color encoder 300 or may be applied to any intermediate storage or transmission media and then provided to the optimized color decoder 400. The compressed data 408 may comprise both compressed image data 410 and color space parameters 412. The de-multiplexer 402 receives the compressed data 408 and separates any color space parameters 412 from the compressed data 408, producing the compressed image data 410, which is in the format expected by the decoder 404. The color space parameters 412 recovered by the de-multiplexer 402 will typically include the color space parameters 310 presented to the optimized color encoder 300 of FIG. 3. This allows the optimized color decoder 400 to have precise knowledge of the color space parameters 310 that correspond to the original input bitmap 308. The number of different sets of color space parameters separated by the de-multiplexer 402 depends upon the number appended by the multiplexer 306 of the optimized color encoder 300.

The decoder 404 provides decompression of the compressed image data 410. It should be understood that any type of decompression may be employed within the scope of the present invention. In embodiments wherein the color optimized encoder 300 compressed the input bitmap 308 in a new color space (i.e. a compression color space, e.g., a compression optimized color space or a destination output color space), the decoder 404 receives the compressed image data 410 and the color space parameters for that compression color space. Using those compression color space parameters, the decoder 404 decompresses the compressed image data 410, resulting in decompressed image data 414. For example, if in an embodiment, the encoder 304 had used the color space parameters 310 to control the encoding quantization matrices, then the decoder 404 may use the color space parameters 412 to compute the same quantization matrices, in order to properly reverse the effects of data weighting at the encoder 304, which are determined by such matrices.

If the optimized color decoder 400 is to provide an output bitmap 418 in a color space different from the color space of the compressed image data 410, the decoder 400 employs a post-mapper 406, which provides the ability to convert pixel values of the decompressed image data 414 from the compression color space to an output color space. The post-mapper receives the decompressed image data 414 from the decoder 404, as well as parameters for the color space of the decompressed image data 414 (e.g., original input color space parameters or compression optimized color space parameters) and the output color space parameters 416. In embodiments of the present invention wherein the input bitmap 308 was compressed from an input color space to a compression optimized color space, the color space parameters provided to the post-mapper may include sets of parameters for all three spaces: the input color space parameters, the compression optimized color space parameters, and the output color space parameters 416. In embodiments of the present invention wherein the input bitmap 308 was compressed in the original input color space, the color space parameters provided to the post-mapper may include only the input color space parameters and the output color space parameters 416.

Using the multiple sets of color space parameters, the post-mapper 406 converts the pixel values of the decompressed image data 414. In one embodiment, the post-mapper 406 converts the decompressed image data 414 from the original input color space to a different output color space. In another embodiment, the post-mapper 406 converts the decompressed image data 414 from a compression optimized color space to the original input color space. In a further embodiment of the present invention, the post-mapper 406 converts the decompressed image data 414 from a compression optimized color space to an output color space. While the foregoing provides exemplary embodiments of the present invention, it should be recognized that the post-mapper 406 may convert between any desired color spaces within the scope of the present invention.

The optimized color decoder 400 outputs an output bitmap 418 in the desired color sp ace (e.g., the original input color space or a new output color space). In addition, the optimized color decoder 400 may also output the color space parameters 412 used in the optimized color encoder 300 and the optimized color decoder 400. The number of sets of color space parameters 412 output by the decoder depends on the number of sets of color space parameters used. By outputting the color space parameters 412, other applications may be provided color space information for further processing as desired.

Figure 5:
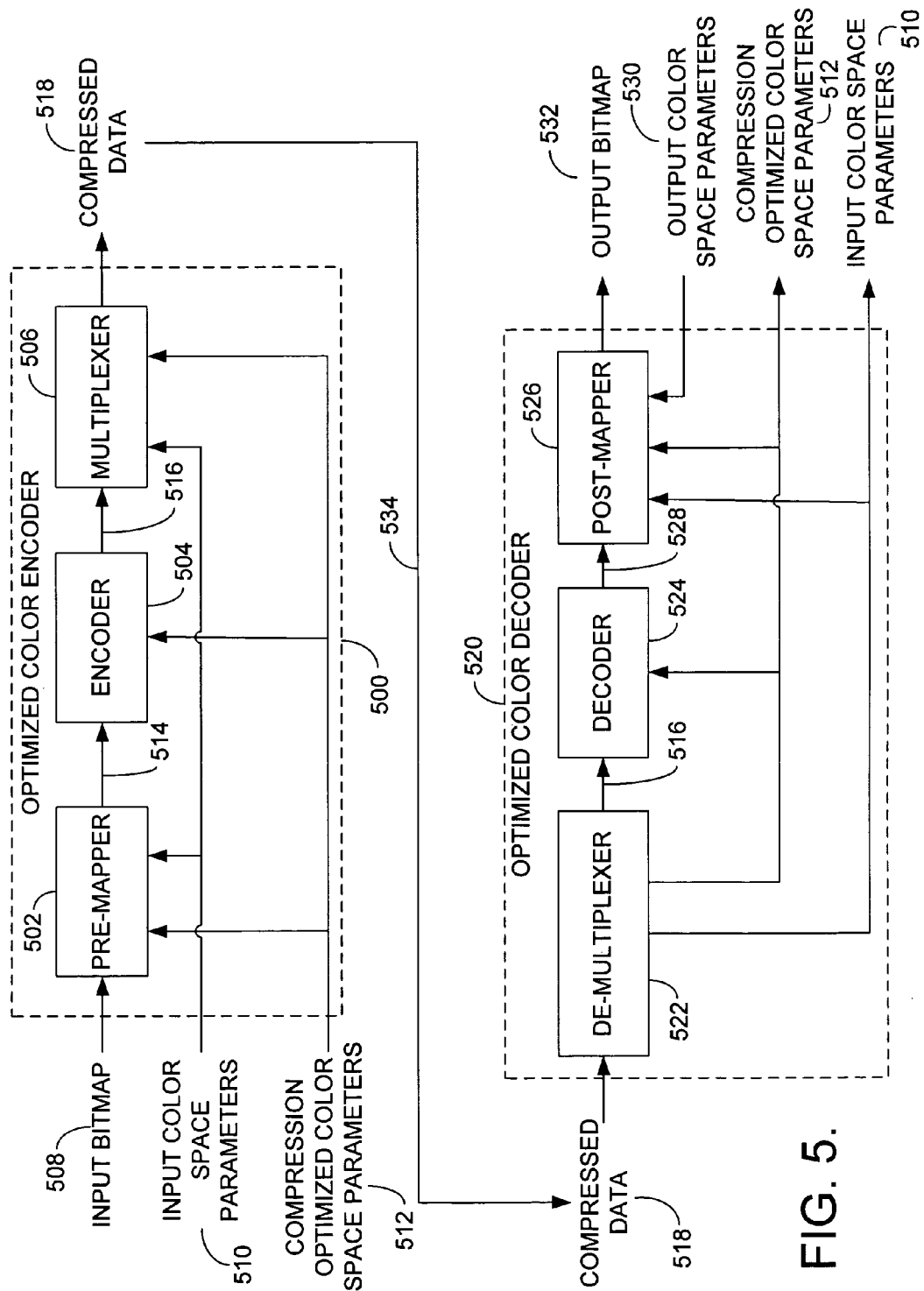
FIG. 5 is a block diagram illustrating compression of a bitmap to a compression optimized color space using an optimized color encoder and decompression of the compressed bitmap to an output color space using an optimized color decoder in accordance with an embodiment of the present invention.

Turning now to FIG. 5, a block diagram is illustrated that shows an embodiment of the present invention in which an input bitmap 508 in an input color space is compressed to a compression optimized color space, and the compressed image is decompressed to an output color space. As shown in FIG. 5, a number of inputs are provided to the optimized color encoder 500, including input bitmap 508, input color space parameters 510, and compression optimized color space parameters 512. The input bitmap 508 contains the pixel values of the image to be compressed. The input color space parameters 510 specify properties regarding the color space of the input bitmap 508. The compression optimized color space parameters 512 specify properties of a compression optimized color space. The input bitmap 508 and the input color space parameters 510 may have been received, for example, from an application in which the data resides. The compression optimized color space parameters 512 may have been provided to the optimized color encoder 500, for example, from an external source or may be maintained by the optimized color encoder 500. In some applications it is advantageous to have the compression optimized color space parameters 512 determined by an external source, for example a software application that produces the input bitmap 508, because that application may have additional knowledge about the content of the bitmap 508, and that knowledge may be used to provide color space parameters that are truly optimized for the input data. For example, the application may know that the input bitmap 508 corresponds to an outdoor scene with significant amounts of blue sky, and thus the compression optimized color space parameters 512 may include additional information about the histogram, indicating that pixel values near sky blue are more frequent, and the encoder 504 could then adjust its internal parameters so that near sky blue colors are reproduced with better fidelity, so that encoding errors are less visible in the sky regions.

A pre-mapper 502 receives the input bitmap 508, the input color space parameters 510, and the compression optimized color space parameters 512. Using the two sets of color space parameters, the pre-mapper 502 converts the pixel values of the input bitmap 508 from the input color space to the compression optimized color space and outputs mapped pixel values 514. An encoder 504 receives the mapped pixel values 514, which are in the compression optimized color space, from the pre-mapper 502. The encoder 504 also receives the compression optimized color space parameters 512. Using the compression optimized color space parameters 512, the encoder 504 compresses the mapped pixel values 514 resulting in compressed image data 516. A multiplexer 506 receives the compressed image data 516 from the encoder 504, as well as the input color space parameters 510 and the compression optimized color space parameters 512. The multiplexer 506 then appends the two sets of color space parameters to the compressed image data 516. Accordingly, the compressed data 518 output from the optimized color encoder 500 comprises the compressed image data 516, the input color space parameters 510, and the compression optimized color space parameters 512.

The compressed data 518 is applied to intermediate media 534, which may be any type of transmission or storage media between the optimized color encoder 500 and the optimized color decoder 520. The optimized color decoder 520 receives the compressed data 518 via the intermediate media 534. The de-multiplexer 522 separates the input color space parameters 510 and the compression optimized color space parameters 512 from the compressed image data 516. The compressed image data 516 and the compression optimized color space parameters 512 are provided to the decoder 524. Using the compression optimized color space parameters 512, the decoder 524 decompresses the compressed image data 516, providing decompressed image data 528. The decompressed image data 528 is then provided to the post-mapper 526. In addition, the post-mapper 526 is provided the input color space parameters 510, the compression optimized color space parameters 512, and output color space parameters 530. Using the three sets of color space parameters, the post-mapper 526 converts the decompressed image data 528 to the output color space. Accordingly, the optimized color decoder 520 outputs an output bitmap 532 in the output color space, as well as the various color space parameters.

Figure 6:
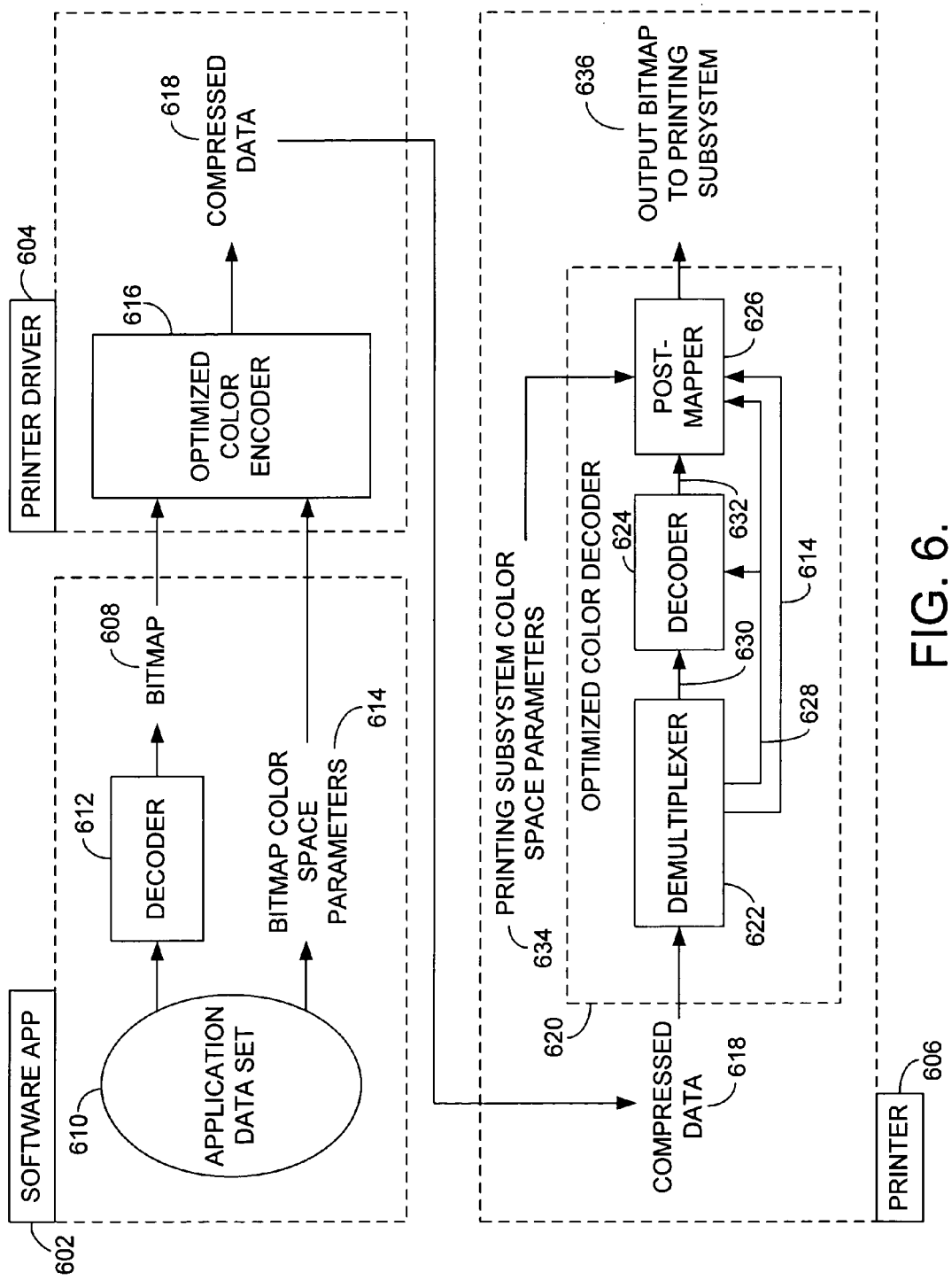
FIG. 6 is block diagram showing an exemplary use of an optimized color encoder to compress a bitmap at a printer driver and an optimized color decoder at a printer to decompress the bitmap in a color space appropriate for the printer.

Having described the invention in general terms, a more detailed, exemplary embodiment will now be described with reference to FIG. 6. Generally, FIG. 6 illustrates an exemplary embodiment in which a bitmap 608 from a software application 602 is compressed at a printer driver 604 in one color space, transmitted to a printer 606 in a compressed format, and decompressed at the printer 606 in a new color space that is appropriate for the printer 606. It may be desirable to compress the bitmap 608 at the printer driver 604 and transmit it to the printer 606 in a compressed format, for example, because the transmission media (e.g., a USB cable) between the printer driver 604 and the printer 606 has limited bandwidth. Additionally, the use of compressed bitmap representations generally lead to significantly reduced internal memory requirements for the printer 606.

The software application 602 and printer driver 604 may reside, for example, on a personal computer. In such an example, an image may be encoded on the personal computer, transmitted to the printer 606 in the compressed format, and decoded at the printer 606 for printing. However, the software application 602 and printer driver 604 or similar components may reside on another type of device, such as a digital camera, for example. The digital camera may be connected to the printer 606, compress an image, and communicate the compressed image to the printer 606. The printer 606 may then decode the compressed image from the digital camera and print the image.

The software application 602 contains a bitmap 608, which may have been included in an application data set 610 in a compressed format. The software application 602 obtains the bitmap 608 in a decompressed format by using, for example, decoder 612, which may employ the appropriate kind of decompression to produce the bitmap 608. The software application 602 also contains bitmap color space parameters 614, which include information regarding the color space in which the bitmap 608 resides.

The software application 602 transfers the bitmap 608 and the bitmap color space parameters 614 to the printer driver 604, which contains an optimized color encoder 616 similar to that shown in and described with reference to FIG. 3. The optimized color encoder 616 receives both the bitmap 608 and the bitmap color space parameters 614. The optimized color encoder 616 maintains compression optimized color space parameters and compresses the bitmap 608 to the compression optimized color space, outputting compressed data 618.

The compressed data 618 is sent from the printer driver 604 to the printer 606, which contains an optimized color decoder 620 similar to that shown in and described with reference to FIG. 4. The de-multiplexer 622 separates out the bitmap color space parameters 614 and the compression optimized color space parameters 628 from the compressed bitmap 630. The decoder 624 uses the compression optimized color space parameters 628 to decompress the compressed bitmap 630. The post-mapper 626 receives the decompressed bitmap 632 from the decoder 624. In addition, the post-mapper 626 receives the bitmap color space parameters 614 and the compression optimized color space parameters 628 from the de-multiplexer 622. The printer 606 maintains a set of printing subsystem color space parameters 634 to allow it to convert image data to a color space appropriate for the printer 606. Using the printing subsystem color space parameters 634, the bitmap color space parameters 614, and the compression optimized color space parameters 628, the post-mapper 626 converts the decompressed bitmap 632 to the printing subsystem color space. An output bitmap 636 in that color space is then provided to the printing subsystem.

As can be understood, embodiments of the present invention provide methods for providing optimized color compression and decompression of images. Further embodiments of the present invention provide an optimized color encoder and an optimized color decoder that allow for programmable color space parameters and are capable of compressing and decompressing color images in any given color space.

It should be noted that embodiments of the present invention may be employed by a wide variety of devices and are not limited to a computing environment such as a personal computer. By way of example only and not limitation, encoding and/or decoding in accordance with embodiments of the invention may be carried out on a printer, a MFP, a digital still camera, a digital video camera, a media player, a personal data assistant, a media host device, a handheld device, and a cellular phone. A plethora of other devices and computing environments abound in which embodiments of the present invention may be employed. Both encoding and decoding may be performed on the same device or encoding may be carried out on one device and decoding may be performed on another device.

The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. One or more computer-storage media having computer-usable instructions embodied thereon for performing a method of encoding color image data, the method comprising:
   providing input data, wherein the input data comprises
      (1) input image pixel data encoded in a first color space and
      (2) input color space parameter data that specifies at least one property of a second color space, wherein the second color space is specified from among a plurality of color spaces and is different from the first color space;
   compressing the input image pixel data based on at least a portion of the input color space parameter data to create compressed image pixel data; and
   appending at least a portion of the input color space parameter data with the compressed image pixel data.

2. The media of claim 1, wherein the second color space is the color space of the compressed image pixel data.

3. The media of claim 2, further comprising converting the input image pixel data from the first color space to the second color space using the input color space parameter data, thereby creating converted image pixel data.

4. The media of claim 3, wherein compressing the input image pixel data comprises compressing the converted input image pixel data based on at least a portion of the input color space parameter data that specifies at least one property of the second color space.

5. The media of claim 1, wherein the second color space comprises a destination device optimized color space.

6. The media of claim 1, wherein the input color space parameter data comprises at least one of a color coordinate space, a bit format, a tone reproduction curve, and a color space primary.

7. The media of claim 1, wherein the color image data comprises at least one of a static image and a video image.

8. One or more computer-storage media having computer-usable instructions embodied thereon for performing a method of decoding compressed image pixel data, the method comprising:
   providing compressed data, the compressed data comprising compressed image pixel data and color space parameter data, wherein the color space parameter data comprises data that specifies at least one property of a first color space and data that specifies at least one property of a second color space, wherein the second color space is specified from among a plurality of color spaces, and wherein the second color space is different from the first color space;
   separating the color space parameter data from the compressed image pixel data; and
   decompressing the compressed image pixel data based on at least a portion of the color space parameter data to create decompressed image pixel data.

9. The media of claim 8, further comprising converting the color space of the decompressed image pixel data using at least a portion of the color space parameter data.

10. The media of claim 9, wherein the compressed data comprises additional color space parameter data specifying at least one property of a third color space.

11. The media of claim 10, wherein the third color space is a destination device optimized color space.

12. The media of claim 11, further comprising converting the decompressed image pixel data to the third color space using at least a portion of the color space parameter data and at least a portion of the additional color space parameter data.

13. One or more computer-storage media storing an optimized color encoder for encoding color image data, the optimized color encoder comprising:
   a receiving component for receiving input data comprising input image pixel data and input color space parameter data, wherein the input color space parameter data is separate from the input image pixel data and specifies at least one property of a decompression color space for the input image pixel data, wherein the decompression color space is specified from among a plurality of color spaces, wherein the decompression color space is different than a color space of the input image pixel data and wherein the decompression color space is a destination output color space of a destination output device;
   an encoding component for compressing the input image pixel data based on at least a first portion of the input color space parameter data to create compressed image pixel data; and
   a multiplexing component for appending at least a second portion of the input color space parameter data with the compressed image pixel data, wherein the second portion of the input color space parameter data specifies the at least one property of the destination color space into which the compressed image pixel data is to be decompressed.

14. The media of claim 13, further comprising a mapping component for converting the input image pixel data from a first color space to a second color space to create converted input image pixel data.

15. The media of claim 14, wherein the encoding component compresses the converted input image pixel data.

* * * * *

UNITED STATES PATENT AND TRADEMARK OFFICE
CERTIFICATE OF CORRECTION

PATENT NO. : 7,706,607 B2  
APPLICATION NO. : 11/159803  
DATED : April 27, 2010  
INVENTOR(S) : Henrique S. Malvar et al.

Page 1 of 1

It is certified that error appears in the above-identified patent and that said Letters Patent is hereby corrected as shown below:

In column 5, line 32, after "110." insert -- Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media. --.

Signed and Sealed this  
Fifteenth Day of February, 2011

David J. Kappos  
*Director of the United States Patent and Trademark Office*